US007682589B2

(12) United States Patent
Gorset et al.

(10) Patent No.: US 7,682,589 B2
(45) Date of Patent: Mar. 23, 2010

(54) METHOD FOR INDUSTRIAL MANUFACTURE OF PURE MGCO₃ FROM AN OLIVINE CONTAINING SPECIES OF ROCK

(75) Inventors: Oddvar Gorset, Roa (NO); Harald Johansen, Sorumsand (NO); Jan Kihle, Skedsmokorset (NO); Ingrid Anne Munz, Oslo (NO); Arne Raaheim, Nannestad (NO)

(73) Assignee: Institutt for Energiteknikk, Kjeller (NO)

( * ) Notice: Subject to any disclaimer, the term of this patent is extended or adjusted under 35 U.S.C. 154(b) by 0 days.

(21) Appl. No.: 12/094,171

(22) PCT Filed: Nov. 23, 2006

(86) PCT No.: PCT/NO2006/000427

§ 371 (c)(1),
(2), (4) Date: May 19, 2008

(87) PCT Pub. No.: WO2007/069902

PCT Pub. Date: Jun. 21, 2007

(65) Prior Publication Data

US 2008/0299024 A1    Dec. 4, 2008

(30) Foreign Application Priority Data

Nov. 24, 2005    (NO)    .................................  20055571

(51) Int. Cl.
*C01F 1/00*    (2006.01)
*C01F 5/00*    (2006.01)
*C01F 5/24*    (2006.01)

(52) U.S. Cl. ........................ 423/430; 423/158; 423/159; 423/160; 423/165; 423/432

(58) Field of Classification Search ................. 423/155, 423/158–161, 165, 430, 432
See application file for complete search history.

(56) References Cited

U.S. PATENT DOCUMENTS 5,780,005 A * 7/1998 Olerud ........................ 423/335

(Continued)

OTHER PUBLICATIONS

W.K. O'Connor, D.C. Dahlin, D.N. Nilsen, R.P. Walters, and P.C. Turner. "Carbon Dioxide Sequestration by Direct Aqueous Mineral Carbonation." Mar. 5-8, 2001. Albany Research Center. Proceedings of the 25th International Technical Conference on Coal Utilization & Fuel Systems.*
Huijgen et al. "Carbon dioxide sequestration by mineral carbonation Literature Review Update 2003-2004." 2004.*
Park et al. "CO2 mineral sequestration: physically activated dissolution of serpentine and pH swing process." Chemical Engineering Science 59, 5241-5247. 2004.*
O'Connor et al, Carbon dioxide sequestration by direct mineral carbonation . . . , Minerals and Metallurgical Processing, vol. 19, No. 2, pp. 95-101 (2002).
Fauth et al, Binding carbond dioxide as carbonate minerals, Proc. Ann. Int. Pittsburgh Coal Conf., 17:1154-1160 (2000).
O'Connor et al, Final Report: Aqueous mineral carbonation, Albany Research Center (2005).

*Primary Examiner*—Scott Kastler
*Assistant Examiner*—Brian Walck
(74) *Attorney, Agent, or Firm*—Dennison, Schultz & MacDonald

(57) ABSTRACT

Method for industrial manufacture of pure $MgCO_3$ comprising providing an olivine containing species of rock, to comminute the olivine containing species of rock to increase its surface, to contact the comminuted olivine containing species of rock with water and $CO_2$. The process is conducted in at least two steps, namely a first step (R1) at a first pH where a dissolving reacting as represented the equation: $Mg_2SiO_{4(S)} + 4H^+ = 2Mg^{2+} + SiO_{2(aq)} + 2H_2O$, takes place. Then a precipitation takes place in the second step (R2) at a higher pH as represented by the equations: $Mg^{2+} + HCO_3^- = MgCO_{3(S)} + H^+$, and $Mg^{2+} + CO_3^{2-} = MgCO_{3(S)}$, the presence of $HCO_3^-$ and $H^+$ ions mainly provided by the reaction between $CO_2$ and water.

22 Claims, 3 Drawing Sheets

U.S. PATENT DOCUMENTS

2004/0213705 A1* 10/2004 Blencoe et al. ............. 422/129
2004/0219090 A1* 11/2004 Dziedzic et al. .......... 423/437.1
2005/0002847 A1* 1/2005 Maroto-Valer et al. ...... 423/432
2005/0180910 A1* 8/2005 Park et al. .................. 423/432

* cited by examiner

METHOD FOR INDUSTRIAL MANUFACTURE OF PURE MGCO₃ FROM AN OLIVINE CONTAINING SPECIES OF ROCK

BACKGROUND OF THE INVENTION

The present invention concerns a method for industrial manufacture of a pure magnesium carbonate (magnesite) from an olivine containing species of rock while immobilizing $CO_2$. The method allows simultaneous manufacture of other valuable products, hereunder particularly amorphous silica.

Anthropogenic emission of $CO_2$ is by many considered to be one of the largest environmental problems in our time. The Kyoto obligations imply various types of fees when $CO_2$ is released. There is thus a demand for cost-effective methods of handling $CO_2$. Injection into water containing or empty petroleum reservoirs has been suggested as a method for deposition/removal of $CO_2$ in which $CO_2$ has been used to expel more hydrocarbons from hydrocarbon reservoirs (EOR) is a variant which may involve economical advantages.

Another possibility is to bind $CO_2$ as carbonates by reacting $CO_2$ with species of rock/minerals which contain elements that together with $CO_2$ provides solid substances/minerals (carbonates) of which the most relevant elements for the manufacture are Ca, Mg, and Fe.

$CO_2$ can e.g. be bound to MgO resulting in precipitation of $MgCO_3$. This reaction implies that $CO_2$ which is produced in industrial processes, like e.g. gas power plants, hydrogen production from natural gas or from methane production, can be immobilized.

Manufacture of MgO from magnesite ($MgCO_3$) or dolomite ($CaMg(CO_3)_2$) is however not interesting since the production of MgO in these cases will imply formation of the same amount of $CO_2$ as can be immobilized, hence the net $CO_2$ effect is zero.

With regard to the manufacture of MgO from other sources than carbonates, like magnesium containing silicates (sulphates and phosphates) the situation is different. Such a manufacture of MgO only to immobilize $CO_2$ will however be expensive. ON the other hand the economical potential for such a way to immobilize $CO_2$ could be significantly improved and possibly be profitable if $CO_2$ and water in various amounts are brought to react with a species of rock or a mineral in an industrial process where valuable products are formed during the immobilization of the $CO_2$. An example of a suitable species of rock is dunite which mainly is comprised by the mineral olivine (+90%), which I Norway is found in large deposits at Sunnmoere and in Nordfjord. (The Aaheim occurrence alone served about 65% of the world market in 2006). This species of rock has in various acidic processes been considered as raw material for magnesium production and for production of amorphous silica.

$CO_2$ with or without various amounts of water, used as an industrial chemical in industrial processes to provide the combined saleable products, $MgCO_3$, amorphous silica, $Fe_2O_3$, $(Fe, Mg)Cr_2O_4$, and Pt, while simultaneously immobilizing $CO_2$, has not previously been done.

The rock species dunite typically comprises more than 90% of the mineral olivine. Olivine occurs in a miscible (isomorphous) series in which the most common miscible minerals (end units) are forsterite $Mg_2SiO_4$ and fayalite $Fe_2SiO_4$. In the dunite occurrence in Aaheim the forsterite and fayalite components constitute 93% and 7% respectively. Olivine is not stable at the temperature and pressure conditions that exist at the earth surface. This mineral will e.g. react with $CO_2$ in water under formation of carbonates. In nature, however, this general reaction progresses relatively slow:

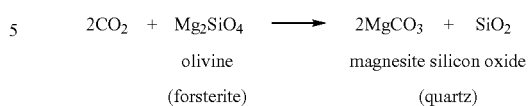

The reaction rate can be increased to convenient process rates under laboratory and industrial process conditions and can be optimized by varying pressure, temperature as well as the amount ratio of $CO_2$ to $H_2O$.

The rock species dunite comprises in addition to the main constituent olivine minerals like e.g. chromite/magnesium chromite (Fe, Mg) $Cr_2O_4$ (0, 2-5%) and chrome containing chlorite. Chromite which is formed at deep levels in the earth crust by solidification of mafic melts or the uppermost part of the earth mantel (dunite, periodite and other ultra mafic rock species) also comprises the noble metal platinum and platinum group metals like palladium, osmium, iridium, and ruthenium. Rock species rich in chromite can contain from 0.1 to 6-7 ppm of platinum group metals. In some cases a content of up to 50 ppm has been described.

Direct carbonation of olivine has earlier been described as a one-step process (Fauth et al. 2000; O'Connor et al., 2002, 2005). The process makes use of a mixture of water, $CO_2$ and olivine and the dissolving of olivine and the precipitation of carbonate and silica takes place in one single operation. Experiments have been performed within a temperature and $CO_2$ pressure of 25-250° C. and 25-250 bars in closed autoclaves. Magnesium carbonate and silica are identified as reaction products. The reaction rate and degree of conversion are low especially at low temperatures and pressures. The effect of grain size, temperature and $CO_2$ pressure has been systematically investigated. This process, however, gives little ability to distinguish between reaction products.

Multi step processes for carbonation of olivine, serpentine or other silicates have also been investigated. In these processes, however, $CO_2$ is not included as a reactant in the first step. Blencoe et al (2004) describes a process where silicates are dissolved with lye in a first reaction chamber. The dissolved metal hydroxide is thereafter reacted with gas in a separate reaction chamber for formation of carbonates. In several processes acid is used to dissolve silicates (Maroto-Valer et al., 2005; Park et al., 2005). $CO_2$ then is added to solution only after silicate minerals have been dissolved in an acidic solution. Dziedic et al (2004) describes a method for dissolving $CO_2$ in water in which metal ions (Na, Mg, Ca) are added to precipitate salts from the carbonic acid. The method however does not address the problem of how to provide the metal ions.

SUMMARY OF THE INVENTION

With a basis in the prior art technology it is an object of the present invention to provide a method for cost-efficient production of magnesium carbonate from natural species of rock such as dunite.

It is a further object of the invention to provide a process as mentioned above which can be combined with effective immobilization of $CO_2$.

It is a further object of the invention to provide a process as mentioned above which is environmentally friendly and which does not require use of strong chemicals such as strong acids.

It is also an object of the invention to provide a method as mentioned above which allows simultaneous manufacture of other valuable products based on the same species of rock.

The method according to the present invention provides a simple, rational, cost-effective and environmentally friendly process for production of highly pure magnesium carbonate from natural sources of dunite (olivine).

The method according to the present invention is a process comprising at least two steps in which the first step can be denoted a dissolution process. Thus, magnesium from forsterite, which is the major constituent of olivine, is dissolved in this first step of the process. However, already in this first step of the process precipitation in the form of iron hydroxides occurs as iron will always be present in natural occurrences of dunite/olivine.

In a second step highly pure magnesium carbonate is precipitated as shown in the following examples. The conditions of step 2 can, like in step 1, vary significantly, but it is a characterizing feature of step 2 that a pH higher than the pH of step 1 is used. As elaborated below the pH adjustment may be preformed without addition of further chemicals in the process.

The method according to the invention does not require use of strong reagents and is generally only based on the reaction between $CO_2$, water and the species of rock in question in an appropriate combination.

Its preferred that the method according to the present invention also comprises isolation of amorphous silica by precipitation which most conveniently takes place in a step subsequent to the step of precipitation of magnesite. While precipitation of magnesite largely is decided by pH, precipitation of silica is largely decided by temperature. Careful control with these parameters allows quantitative isolation of each of said components in separate steps.

DESCRIPTION OF THE PREFERRED EMBODIMENTS

Figure 1:
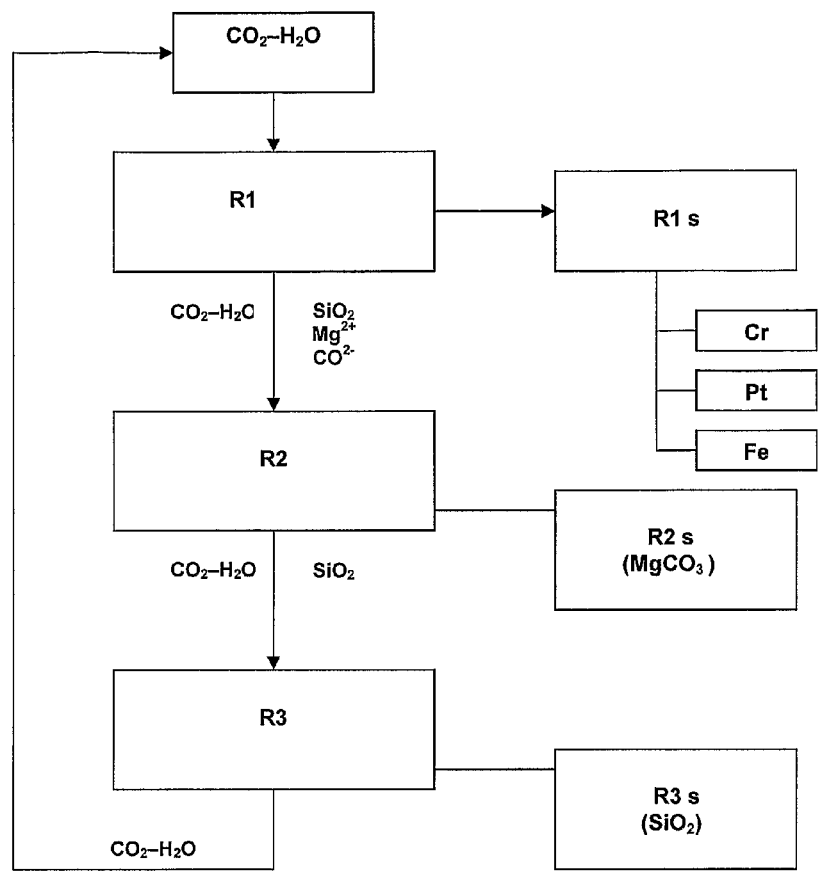
FIG. 1 is a flow chart which schematically shows the general steps of the process according to the present invention.

FIG. 1 shows how $CO_2$ from a source which can be a combustion plant or any other $CO_2$ source is combined with water in the uppermost box in FIG. 1. Then dunite is added to or combined with this mixture in a reactor chamber denoted R1. The dunite is before or in the reactor R1 comminuted to obtain a large surface to volume ratio. In water $CO_2$ forms carbonic acid. $CO_2$ has however limited solubility in water and higher solubility at high pressure than at low pressure. If sufficient $CO_2$ is added so that the water at all times is saturated with $CO_2$, the pH in the solution will be a direct function of pressure.

In the first step, R1, of the process forsterite is dissolved in a way that can be represented by the equation:

$$Mg_2SiO_{4(s)} + 4H^+ = 2Mg^{2+} + SiO_{2(aq)} + 2H_2O,$$

This reaction is sufficiently fast for industrial purposes within a broad range of pressures and temperatures but requires a pH in the acidic range and therefore a certain overpressure (in order to dissolve a convenient amount of $CO_2$) to provide an optimal result. Present iron from fayalite and other sources which in this context is to be considered as contaminations in the process, are already in this step dissolved and precipitated as hydroxides and possibly oxides.

Solid material from the first step in the form of non-reacted, solid components and precipitated material from iron as mentioned above and possibly other precipitated materials, are separated out to R1 s before the liquid reaction mixture is transferred to next step R2. The solid material in R1 can optionally be refined further to other end products such as chrome, iron and small amounts of Pt. The liquid reaction mixture which is rich in magnesium ions, is transferred to next step, R2, which has a higher pH than the first step for thereby facilitate the precipitation of magnesium as magnesite. According to the present invention the second step R2 is conducted at a pH which is higher than that of the first step R1, and the required pH adjustment is feasible solely by means of a pressure reduction of the reaction mixture so that the amount of $CO_2$ dissolved in the water is automatically reduced with implies a reduction of concentration of carbonic acid in the water. It is possible within the scope of the invention also to adjust pH chemically, but the process then becomes less environmentally friendly. Precipitation of magnesite furthermore is favoured by high temperature and therefore the temperature of process step 2 is preferably higher than the temperature of process step 1. Precipitation can also be conducted without pressure adjustment between process step 1 and 2. Higher temperature generally gives a higher pH. The reaction in second step R2 can be described as follows:

$$Mg^{2+} + HCO_3^- = MgCO_{3(s)} + H^+, \text{ og}$$

$$Mg^{2+} + CO_3^{2-} = MgCO_{3(s)}.$$

The solid magnesite material, $MgCO_{3(s)}$, is received in R2 s for optional post-treatment, storage and shipment. For certain embodiments it can be relevant to produce pure (elementary) magnesium from this product.

Between the first and second process step, it is possible but not required to recycle part of the reaction mixture to the first process step.

It is usually desirable to collect silicon that enters the process in a way which allows it to be included as a valuable component in various products. This is most conveniently done through a third process step R3 as shown in FIG. 1 and which directly succeeds process step 2. Precipitation of silicon as amorphous silica is rather independent of pH but is favoured by low temperature. It is therefore convenient that the temperature is lowered from step R2 to the optional step R3. Prior to the precipitation of silica it may be convenient to evaporate the solution to a higher silica concentration. The precipitated amorphous silica is received in R3 s. Remains of liquid material from process step are recycled to a previous step of the process, most preferably to process step 1. Also between R2 and R3 it is possible to withdraw a certain amount of the liquid process flow for recycling (not shown).

Below the most typical uses of the different product components are briefly indicated but it should be emphasized that the present invention is not restricted to only such uses or products.

Solid components from step 1 mostly comprise iron but typically also smaller amounts of chrome and platinum group metals as mentioned. These components can be used for isolation of the pure respective metals which again may be used to form any product based on such metals.

Magnesite or magnesium carbonate from step 2 is used as a filer in paper and plastic products.

Silica can also be used as filler in some connections such as in car tires but can also be used for manufacture of silicon metal which is very valuable if it can be produced with high purity.

As already mentioned the present invention only requires adjustment of pH in the form of addition of $CO_2$ in water and adjustment of pressure. It is thus possible but hardly desirable, to add strong mineral acids or strong organic acids so facilitate the dissolving of minerals in the species of rock. It is required to crush the species of rock in order to obtain a progress sufficient for an industrial process. It is preferred that the species of rock is comminuted to a particle size where (the largest dimension of) each particle is less than 3 mm, more preferred less than 0.5 mm and in some applications less than 01 mm. In a conventional crushing process grinding, sieving, recycling, repeated grinding and repeated sieving makes it possible to ensure that all particles are within the defined limit for the particle size if so desired. It should be emphasized though, that no absolute requirements to the particle size is present with the present invention. The invention will work well if e.g. 80% of the volume of particles are within an indicated grain size limit.

In the first process step the pH should be in the acidic range, i.e. lower than about 7. It is preferred that pH in this step is in the range 3-5, though even lower pH values are acceptable. In the first reactor or reactor chamber a typical pressure is in the range 1-200 bar, more preferred 20-170 bar and most preferred in the range 50-150 bar. In the same process step the temperature preferably is in the range 50-220° C. and more preferred in the range 100-170° C.

In the second process step the pH is always higher than in the first process step. The pressure in the second reactor is typically in the range 1-150 bar, more preferred 20-130 bar and most preferred 50-80 bar. In the same step the temperature preferably is in the range 100-300° C., more preferably 140-250° C.

There are different ways of separating the individual process steps from each other. In a continuous process however, it is required to use separate reactors or separate reactor chambers for each process step in order to maintain mainly constant conditions within each reactor or each individual reactor chamber. Thus the first process step takes place in a first reactor chamber while precipitation of magnesium carbonate takes place in another reactor chamber which solely receives liquid material from the first reactor chamber while non-reacted reactant and precipitated by-products in first reactor chamber are first separated from.

As previously mentioned the pressure is preferably reduced from first reactor chamber to second reactor chamber sp that some $CO_2$ thereby is released from the solution and pH is correspondingly increased. Furthermore the temperature is preferably increased from first to second reactor chamber for thereby favouring precipitation of $MgCO_3$.

When the process comprises a third process step comprising precipitation of amorphous silica, this typically takes place at a lower temperature than the temperature of process step 2.

The olivine containing species of rock used preferably is dunite.

The process typically is conducted as a continuous process with respect to the liquid flow in the process and more preferred the entire process is conducted as a continuous process.

Iron oxides/hydroxides together with insoluble chromite which typically contains PGE are discharged from the dissolution reactor (process step 1) for further treatment in a production plant for manufacture of iron, chrome and platinum group metals.

It should be emphasized that the method according to the present invention also is valuable because it comprises a step of immobilizing $CO_2$ which in large amounts is an undesired greenhouse gas and which constantly will represent a challenge to handle because the traditional energy production and car use will continue to produce large amounts of $CO_2$ all over the world.

EXAMPLES

Two examples are provided. These examples demonstrates step one and a connection between step one and step two of the process. For both examples olivine from North Cape Minerals, denoted GL50, were used. The olivine shows $X_{Mg}=Mg/(Mg+Fe)=0.93$.

A semi-continuous process layout with continuous liquid through-put while solid material was held back in the reactors, was used. At high pressure, high temperature and constant flow rate, $CO_2$ and $H_2O$ are pumped into an autoclave to be mixed. The solution comprising water with dissolved $CO_2$ is thereafter directed to a dissolution reactor in which it is brought to react with olivine. Filters are arranged in the dissolution reactor to prevent solid particles from leaving the reactor.

Figure 2:
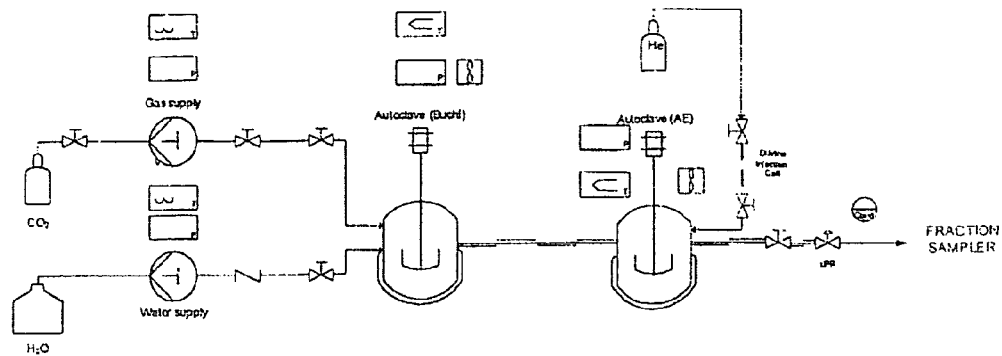
FIG. 2 is a flow diagram showing the layout for the experiment described in Example 1.

For Example 1 the aqueous solution was fed to the dissolution reactor via a back pressure valve to fluid sampling at room temperature and atmospheric pressure. The experimental layout of Example 1 is shown in FIG. 2.

Figure 3:
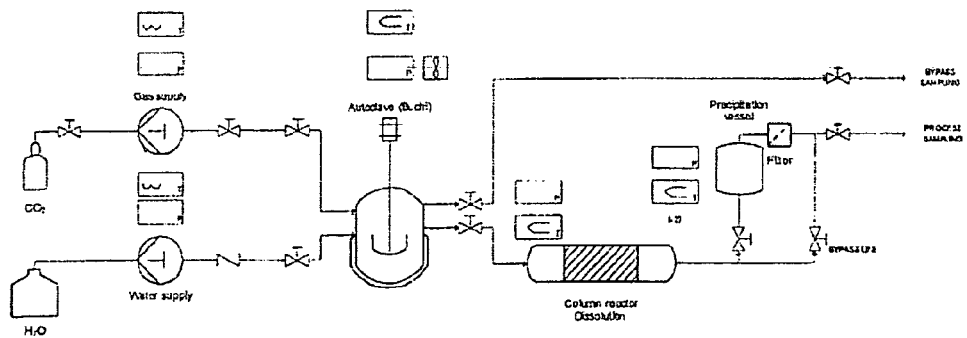
FIG. 3 is a flow diagram showing the layout for the experiment described in Example 2.

For Example 2 the aqueous solution was directed from the dissolution reactor to a precipitation reactor for crystallization of magnesite. Also in this reactor filters were arranged to prevent solid particles from leaving the reactor. Downstream of the precipitation reactor the solution was directed through a back pressure valve to fluid sampling at room temperature and atmospheric pressure. The experimental layout for Example 2 is shown in FIG. 3.

Example 1

Dissolution of Olivine in Step 1

A series of three experiments was conducted (Table 1). Two of the samples were crushed, dry, in a planet mil with different crushing times. The third sample was carefully crushed in a mortar and sieved and the fraction between 75 and 150 μm was used.

The conditions for all these experiments were 130° C. and 150 bar. A total flow rate of 0.75 ml/min in the amounts 0.71 ml/min $H_2O$ and 0.04 ml/min $CO_2$ were used. All parts of the experimental layout were equilibrated to high temperature and high pressure before the sample was injected into the dissolution reactor.

The reaction rate was calculated from the following equation:

$$\text{Rate} = \left(\frac{Conc_i}{v_i}\right) \cdot \left(\frac{FR}{\frac{A}{25}}\right)$$

In which $Conc_i$ is the concentration of Mg or Si in the water samples, $v_i$ are stoichiometric coefficients in olivine, 1.85 for Mg and 100 for Si respectively; FR is flow rate and A is surface area analysed with BET.

Figure 4:
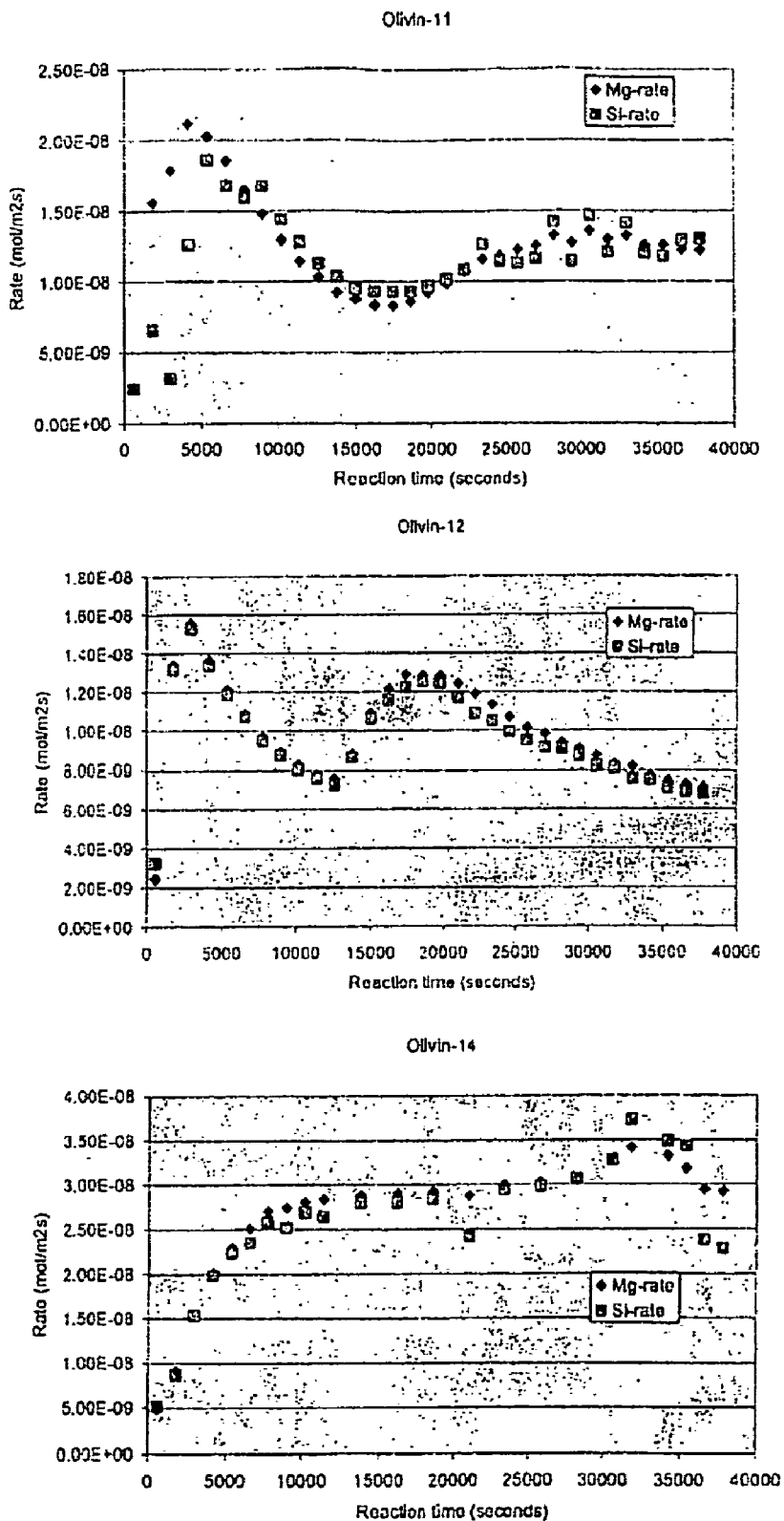
FIG. 4 are plots showing calculated reaction rates for dissolution of olivine in the examples.

An abstract of the experiments are shown in Table 1. Remaining solid material in the reactor after the experiments is comprised by chromite, remains of olivine or other silicates and iron hydroxides. The reaction rate is shown in FIG. 4. Calculated reaction rates are not corrected for changes in surface area during the experiment. The correlation between reaction rate calculated on basis of Mg and Si in FIG. 4 shows that the dissolution reaction is congruent which means that the dissolution of olivine is stoichiometric (complete). The weight loss of solid material in the experiments varies between 67% and 98%.

TABLE 1

Overview of the dissolution tests

| Experiment | Pre-preparation | Weight before g | BET before m²/g | Weight loss g | Weight loss % | Duration hours |
|---|---|---|---|---|---|---|
| Olivine 11 | Planetary mill, 10 min, dry | 0.49 | 4.32 | 0.34 | 70 | 45 |
| Olivine 12 | Planetary mill, 60 min, dry | 0.48 | 3.19 | 0.32 | 67 | 28 |
| Olivine 14 | sieved, 75-150 μm | 1.14 | 0.87 | 1.12 | 98 | 76 |

Example 2

Connection Between Step One and Precipitation of Magnesite in Step Two

In this test a packed column was used as a dissolution reactor. The conditions for dissolution was the same as in the previous example, 130° C. and 150 bar and a total flow rate of 0.75 ml/min in the amounts 0.71 ml/min $H_2O$ and 0.04 ml/min $CO_2$.

The aqueous solution was led directly into a precipitation reactor in which the temperature was 250° C. and the pressure was 150 bar. Only magnesite was precipitated at this stage. Crystals of up to 500 μm were formed. There was no agitation in the precipitation reactor. Analyses of the magnesite are shown in Table 2. The analyses were conducted with a micro probe. The method has few possibilities of determining the content of the heavy elements (Ca, Fe, Mg, Mn) and the $CO_3$ content therefore is calculated from stoichiometry.

TABLE 2

Mineral chemistry of precipitated magnesite

| | #1 | #2 | #8 | #9 |
|---|---|---|---|---|
| | Sample | | | |
| | O120-R2 | O120-R2 | O120-R2 | O120-R2 |
| | weight % | | | |
| $CaCO_3$ | 0.012 | 0.032 | 0.025 | 0.055 |
| $FeCO_3$ | 0.202 | 0.102 | 0.037 | 0.005 |
| $MgCO_3$ | 99.275 | 99.275 | 99.336 | 99.440 |
| $MnCO_3$ | 0.060 | 0.031 | 0.079 | 0.000 |
| | 99.549 | 99.439 | 99.477 | 99.500 |

Table 2 shows a high level of purity for the manufactured magnesite, in the range from 99.275 to 99.440%. In general the examples show that the invention provides results as described and that it is possible to manufacture valuable products from a species of rock while simultaneously immobilizing $CO_2$.

OTHER ASPECTS OF THE PRESENT INVENTION

Using dunite as a source of magnesium a highly convenient combination of industrial, hydro metallurgic processes in which a $CO_2$—$H_2O$ mixture acts as a process chemical is obtained. The $CO_2$ is immobilized and bound in a solid material ($MgCO_3$) which can be deposited or used, this second aspect of the invention briefly stated concerns:

$CO_2$ in the form of carbonate is used as anion for crystallization of the extracted magnesium (immobilization of $CO_2$)

extracted, amorphous $SiO_2$ manufactured as raw material for the production of silicon metal and used directly as filer in e.g. car tires.

extracted $Fe_2O_3$ and Pt containing Mg, Fe)$Cr_2O_4$ are manufactured as raw material for the metals Fe, Cr and Pt.

Method for combining immobilization of $CO_2$ from a combustion plant or another $CO_2$ source, e.g. a power plant powered by fossil fuel and where a magnesium containing, carbonate free species of rock, e.g. a silicate species of rock such as dunite or other olivine containing species of rock such as periodite or similar mineral/species of rock is brought to react with a $CO_2$—$H_2O$ mixture to produce a solution with magnesium and carbonate ions and amorphous silica under continuous and dynamic reaction conditions in the temperature range 50-300° C. and the pressure range 1-200 bar. The process is so arranged that the dominating material olivine in the rock type dunite or other olivine containing rock types is dissolved in a dissolution reactor so that the main part of the iron in the mineral olivine remains in the dissolution reactor as iron oxide/iron hydroxide together with insoluble PGE containing (platinum group metal containing) chromite (Mg, Fe) $Cr_2O_4$. The magnesium and silicon containing solution is brought to precipitation reactors for precipitation of iron free or iron poor magnesium carbonate and amorphous $SiO_2$ respectively, the magnesium carbonate being precipitated in the first precipitation reactor at temperature conditions in the range 100-300° C. and pressure conditions in the range 1-200 bar at a pH of 5-13, while amorphous silica ($SiO_2$) is precipitated in the second precipitation reactor at temperature conditions in the range 20-300° C. and pressure conditions in the range 1-200 bar.

Method as claimed in the paragraph above in which the iron oxides/hydroxides together with insoluble PGE containing chromite (Mg, Fe) $Cr_2O_4$ are discharged from the dissolution reactor for further treatment in a production plant for the manufacture of iron, chrome and platinum group metals.

Method in accordance with the two above adjacent paragraphs in which $CO_2$ is immobilized as magnesium carbonate ($MgCO_3$) which is discharged from the precipitation reactor either for deposition or for further treatment for use as filler e.g. in paper or plastic industry or as a raw material for magnesium production.

Method in accordance with the three above adjacent paragraphs in which the amorphous $SiO_2$ is discharged from the precipitation reactor and treated further e.g. with acid for manufacture of various amorphous $SiO_2$ qualities for use as filler in car tires or as raw material for the manufacture of silicon.

REFERENCES

Fauth D J, Jones J R, Knoer J P and Song Y (2000) Binding carbon dioxide as carbonate minerals. *Proc. Annual Intern. Pittsburgh Coal Conf.* 17: 1154-1160

Blencoe J G (2004) Carbonation of metal silicates for long term CO2 sequestration. US Patent Application 20040213705

Dziedzic D, Gross, K B, Gorski R A and Johnson J T (2004) Sequestration of carbon dioxide. US Patent Application 20040219090

Maroto-Valer M M, Zhang Y, Kutcha M E, Andresen J M and Fauth D J (2005) Process for sequestering carbon dioxide and sulphur dioxide. US Patent Application 20050002847

O'Connor W K, Dahlin D C, Rush G E, Dahlin C L and Collins W K (2002) Carbon dioxide sequestration by direct mineral carbonation: process mineralogy of feed and products. *Minerals & Metallurgical Processing* 19: 95-101

O'Connor W K, Dahlin D C, Rush G E, Gerdemann S J, Penner L R and Nilsen D N (2005) Final report—Aqueous mineral carbonation. Mineral availability, pre-treatment, reaction parametrics and process studies. *DOE/ARC-TR-04-002*

Park A-H and Fan L-S (2005) Carbon dioxide sequestration using alkaline earth metal-bearing minerals. US Patent Application 20050180910

The invention claimed is:

1. Method for industrial manufacture of purified $MgCO_3$ comprising the steps of:
   providing an olivine containing species of rock,
   comminuting the olivine containing species of rock to increase surface area thereof,
   contacting the comminuted olivine containing species of rock with water and $CO_2$, said contacting comprising at least first and second separate steps:
   a first step under pressure and at a first pH in which a reaction dissolving the comminuted olivine containing rock in water containing $CO_2$ takes place generally according to a reaction equation:

$$Mg_2SiO_{4(s)}+4H^+=2Mg^{2+}+SiO_{2(aq)}+2H_2O,$$

producing thereby a solution and non-reacted solid components and precipitated materials which are separated from the solution, and
   a second step in which purified $MgCO_3$ is precipitated from the solution from the first step, conducted at a second pH which is higher than the first pH, with silicate remaining in the solution from which purified $MgCO_3$ has been precipitated, the second step being represented generally by reaction equations:

$$Mg^{2+}+HCO_3^-=MgCO_{3(s)}+H^+, \text{ and}$$

$$Mg^{2+}+CO_3^{2-}=MgCO_{3(s)},$$

the presence of $HCO_3^-$ and $H^+$ ions in the contacting steps being due mainly to a reaction between the $CO_2$ and the water with which the comminuted olivine containing rock is contacted.

2. Method as claimed in claim 1, wherein the olivine containing species of rock is comminuted to a general grain size less than 3 mm.

3. Method as claimed in claim 1, wherein the pH in said first step is in the range 3-5 while the pH in said second step for precipitation of magnesium carbonate is in the range 5-13.

4. Method as claimed in claim 1, wherein the olivine containing species of rock contains iron that is precipitated as iron hydroxide in first step.

5. Method as claimed in claim 1, wherein the first step is conducted in a first reactor chamber and the second step of precipitation of magnesium carbonate is conducted in a second reactor chamber which receives only liquid from the first reactor chamber, while non-reacted reactant and precipitated bi-products are separated out in the first reactor chamber.

6. Method as claimed in claim 5, wherein the pressure is reduced from the first reactor chamber to the second reactor chamber so that some $CO_2$ thereby is released from solution, causing a corresponding increase in pH.

7. Method as claimed in claim 5, wherein a higher temperature is used in the second reactor chamber than in the first reactor chamber, to thereby favor precipitation of $MgCO_3$.

8. Method as claimed in claim 1, wherein said contacting comprises a three step process and the third step is a step of precipitating amorphous silica ($SiO_2$).

9. Method as claimed in claim 8, wherein $SiO_2$ is precipitated from the reaction mixture after $MgCO_3$ has been precipitated and at a lower temperature.

10. Method as claimed in claim 5, wherein the pressure in the first reactor is in the range 1-200 bar.

11. Method as claimed in claim 5, wherein the temperature in the first reactor is in the range 50-220° C.

12. Method as claimed in claim 5, wherein the pressure in second reactor is in the range 1-150 bar.

13. Method as claimed in claim 5, wherein the temperature in the second reactor is in the range 100-300° C.

14. Method as claimed in claim 1, wherein the olivine containing species of rock is Dunite.

15. Method as claimed in claim 1, wherein the process is conducted as a continuous process with respect to liquid flows, solids being retained in each step.

16. Method as claimed in claim 1, wherein the process is conducted as a wholly continuous process.

17. Method as claimed in claim 1, wherein the dissolving reaction takes place without addition of mineral acids and organic acids.

18. Method as claimed in claim 5, wherein the comminuted species of rock has a particle size less than 0.1 mm, the pressure in the first reactor is in the range 50-150 bar, the pressure in the second reactor is in the range 50-80 bar, the pH in the first reactor is in the range 3-5, the pH in the second reactor is in the range 5-13, the temperature in the first reactor is in the range 100-170° C., the temperature in the second reactor is in the range 140-250° C., the process is run free from acid other than $CO_2$ dissolved in water and the process is run as a continuous process.

19. Method as claimed in claim 1, wherein the $MgCO_3$ produced is used as a raw material for production of Mg or as a filler paper or plastic products.

20. Method as claimed in claim 8, wherein the $SiO_2$ produced is used as a raw material for the manufacture of amorphous $SiO_2$ qualities, as a raw material for the manufacture of silicon or as a filler in car tires.

21. Method as claimed in claim 1, wherein the olivine containing species of rock contains iron which is discharged as iron oxides/iron hydroxides together with insoluble platinum group containing chromite from the dissolving step for further treatment in a production plant for the manufacture of iron, chrome and platinum group metals.

22. Method as claimed in claim 1, wherein the $CO_2$ is obtained from an industrial source and immobilized by the method.

* * * * *